(12) United States Patent
Krimple

(10) Patent No.: US 9,660,426 B1
(45) Date of Patent: May 23, 2017

(54) ATTACHMENTS FOR COMPACT TRACTOR FOR PULLING WIRE THROUGH UNDERGROUND CONDUITS

(71) Applicant: KMS Innovations, Alpine, CA (US)

(72) Inventor: Matthew Krimple, Alpine, CA (US)

(73) Assignee: KMS INNOVATIONS, Alpine, CA (US)

( * ) Notice: Subject to any disclaimer, the term of this patent is extended or adjusted under 35 U.S.C. 154(b) by 0 days.

(21) Appl. No.: 15/194,181

(22) Filed: Jun. 27, 2016

Related U.S. Application Data

(60) Provisional application No. 62/346,871, filed on Jun. 7, 2016.

(51) Int. Cl.
*H02G 1/08* (2006.01)

(52) U.S. Cl.
CPC ..................................... *H02G 1/08* (2013.01)

(58) Field of Classification Search
CPC ....................................................... H02G 1/08
See application file for complete search history.

(56) References Cited

U.S. PATENT DOCUMENTS

| | | | | |
|---|---|---|---|---|
| 3,226,088 A | * | 12/1965 | Habighorst | H02G 1/08 254/134.3 R |
| 3,343,739 A | * | 9/1967 | Kinnan | B60P 3/00 226/187 |
| 3,851,489 A | * | 12/1974 | Richardson | H02G 1/06 172/699 |
| 3,905,200 A | * | 9/1975 | Ylinen | H02G 1/06 37/370 |
| 4,103,501 A | * | 8/1978 | Laurent | E02F 5/103 172/40 |
| 4,382,581 A | | 5/1983 | Wimer et al. | |
| 4,836,503 A | | 6/1989 | Giroux | |
| 5,232,205 A | * | 8/1993 | McVaugh | H02G 1/08 254/134.3 R |
| 5,238,225 A | | 8/1993 | Hunt | |
| 6,086,050 A | | 7/2000 | Wiederkehr et al. | |
| 6,193,218 B1 | | 2/2001 | Philyaw | |
| 6,612,516 B1 | * | 9/2003 | Haines | B65H 49/32 242/397.1 |
| 7,431,267 B1 | | 10/2008 | Cunningham | |

* cited by examiner

*Primary Examiner* — Tara M. Pinnock
(74) *Attorney, Agent, or Firm* — Gordon Rees Scully Mansukhani LLP; David R. Heckadon

(57) ABSTRACT

A compact tractor equipped for pulling wire through underground conduits having a boom and dipper on the rear of the compact tractor and a rotatable witch's hat spool assembly on the front of the compact tractor, wherein the spool assembly is mounted onto the loader lifter arms such that it can be easily tilted to dump a roll of cable onto the back of a trailer.

13 Claims, 12 Drawing Sheets

ATTACHMENTS FOR COMPACT TRACTOR FOR PULLING WIRE THROUGH UNDERGROUND CONDUITS

CROSS REFERENCE TO RELATED APPLICATIONS

The present application claims priority to U.S. Provisional Patent Application 62/346,871, filed of same title, filed Jun. 7, 2016, the entire specification of which is incorporated herein by reference in its entirety.

TECHNICAL FIELD

The present system relates to mechanical equipment for pulling cables through underground conduits.

BACKGROUND OF THE INVENTION

Since the 1970's, electrical cables have been placed underground together with their surrounding conduits. During installation, a trench is dug, the cable-in-conduit is laid into the trench and the trench is then backfilled. Unfortunately, over time these cables need to be replaced. This need for replacement is due to many factors including simple cable deterioration and the need to upgrade the electrical infrastructure itself.

In order to upgrade existing electrical cables, utilities currently have two options. First, a trench can be dug and all new conduit and cable installed; or second, the cable can be replaced using the existing conduit. In the second scenario, the cable is simply removed by being pulled out through the conduit. This second scenario typically costs $1/10^{th}$ the cost of the first scenario. Accordingly, it has become desirable for utilities to remove cables without removing their surrounding conduits.

Unfortunately, present cable-pulling systems tend to suffer from their own disadvantages. First, they tend to be large trailer-based systems that are difficult to move close to the location where the cable is actually to be pulled. Second, the cable that is removed from the ground is simply strewn about the ground in a messy pile after it has been pulled from the ground. Third, when pulling the cable, it is preferable that the cable be pulled out of the cable in a direction that is as straight as possible. (This is done to reduce friction). Existing systems often do not provide such straight access. Fourth, the old cables tend to become stuck in the conduits, and it is therefore desirable or required to first lubricate the cables while they are still in the conduit prior to pulling them out of the conduit.

Therefore, what is instead desired is a system that pulls the cable straight out of the conduit (in a path that is co-linear with the conduit itself). Ideally, such a system would also provide the removed cable in a coiled fashion for easy disposal. Such a system would also ideally provide cable lubrication prior to the pull, yet be small enough such that it can easily access the jobsite.

SUMMARY OF THE INVENTION

The present invention provides a modified compact tractor for pulling cable through underground conduits. As will be shown, the present system can both easily pull the cable from the conduit while spooling the cable in a roll for easy dumping into the back of a trailer, thereby avoiding the problem of messy old cables strewn about the ground at the jobsite.

In one preferred aspect, the present system provides an assembly for pulling wire through underground conduits, comprising: (a) a compact tractor; (b) a boom extending from the rear of the compact tractor; (c) a dipper extending from the boom, the dipper having an upper wheel and a lower wheel thereon; (d) a pair of loader lifting arms extending from the front of the compact tractor; and (e) a detachable rotatable spool assembly mounted to the pair of loader lifting arms, wherein the detachable rotatable spool assembly comprises: (i) a detachable mount received onto the pair of loader lifting arms, and (ii) a rotatable spool attached to the detachable mount, wherein the rotatable spool rotates around a vertical axis, wherein movement of the pair of loader lifting arms causes the rotatable spool to pivot about a horizontal axis.

In operation, the pair of loader lifting arms causes the top of the rotatable spool to pivot up and down such that the roll of spooled cable can be conveniently dumped into the back of a trailer.

Preferably, the dipper is easily detachable from the boom, and the rotatable spool assembly is also easily detachable from the pair of loader lifting arms.

Preferably as well, the present system further comprises a compressor and lubrication assembly dimensioned to be mounted onto the pair of loader lifting arms such that the detachable mount of the rotatable spool assembly is interchangeable with the detachable mount of the compressor and lubrication assembly. As a result, the tractor can lift and carry either of the rotatable spool assembly or the compressor and lubrication assembly to the jobsite. In preferred aspects, the compressor and lubrication assembly comprises: (i) a detachable mount received onto the pair of loader lifting arms, (ii) a lubrication system for injecting lube into a conduit; (iii) a compressor for pressurizing the lubrication system, and (iv) a generator for powering the compressor.

In preferred aspects, the rotatable spool is wide at the bottom and narrow at the top and may be generally conical shaped. Optionally, it may also comprises a butterfly reel on top of the rotatable spool.

In preferred aspects, the present system also comprises a drip tray mounted on top of the compact tractor. This drip tray shields the tractor operator from dirt falling off of the cable as the cable passes over the top of the tractor. The drip tray may also have a variable support angle (with respect to the ground) that can be varied manually by the tractor operator.

The present system has many optional advantages. First, the distal end of the dipper arm can be easily dropped to the height of the conduit such that the cable can be pulled out of the conduit in a straight horizontal line. The dipper arm is preferably centered in the left/right direction on the tractor frame to provide stability during the pull. Preferably as well, the lower wheel of the dipper is rotatable about a longitudinal axis of the dipper such that the lower wheel can be angled to provide a straight cable pull even if a centerline of the tractor frame is not exactly centered over the conduit in the ground.

Second, the compression and lube assembly is preferably removable from the pair of front lifting loader arms such that the spool assembly and the compression and lube assembly can be separately moved quickly and easily to the jobsite.

Third, the present spool assembly can easily spool the cable removed from the ground into a roll that can conveniently be dumped into the back of a trailer using the same mechanisms that traditionally lift and dump the bucket on the front of a standard backhoe or compact tractor. Preferably, the spool assembly on the front of the tractor is able to rotate in either direction

DETAILED DESCRIPTION OF THE DRAWINGS

Figure 1A:
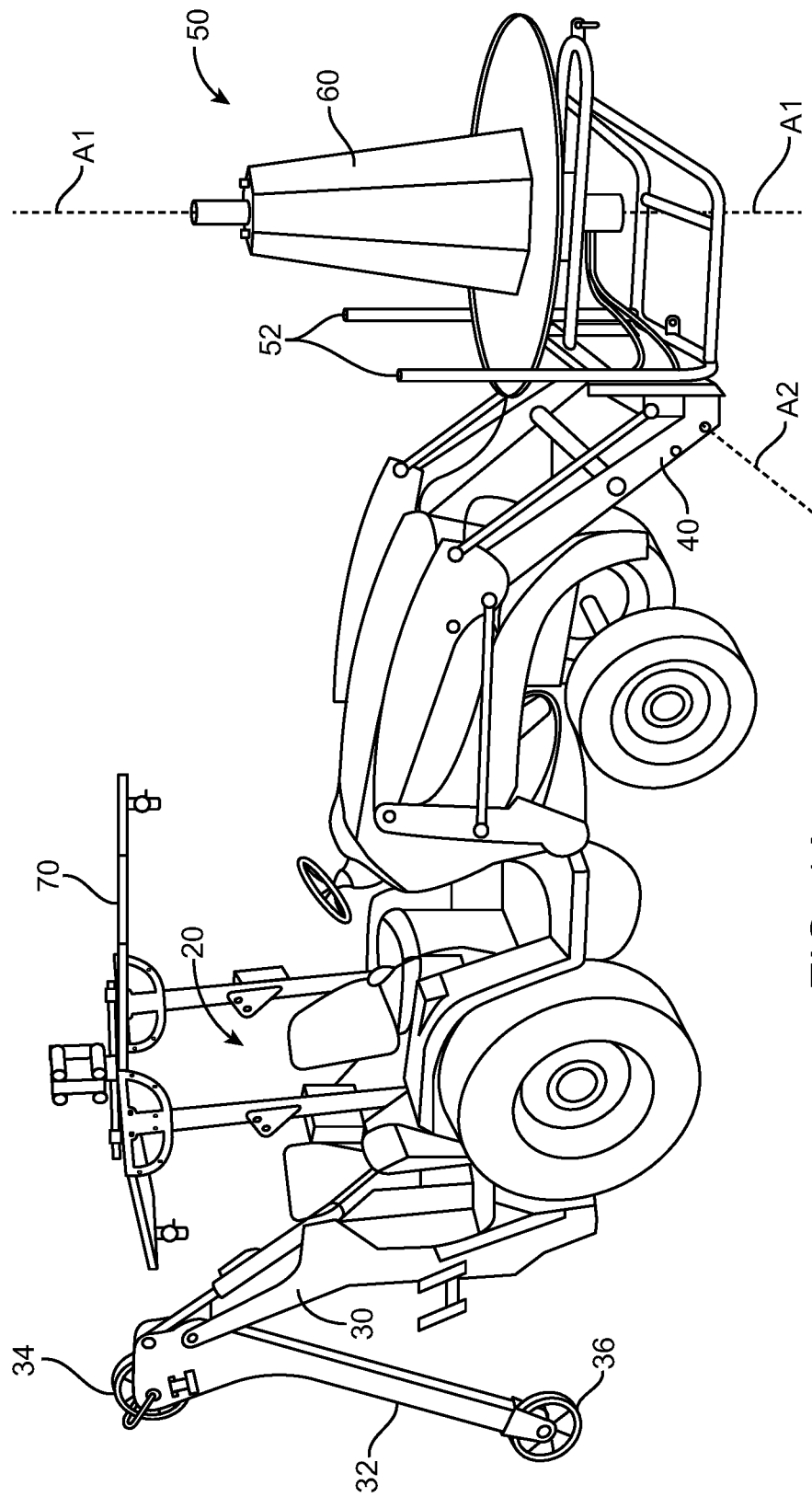
FIG. 1A is a front perspective view of the present modified compact tractor assembly.
Figure 1B:
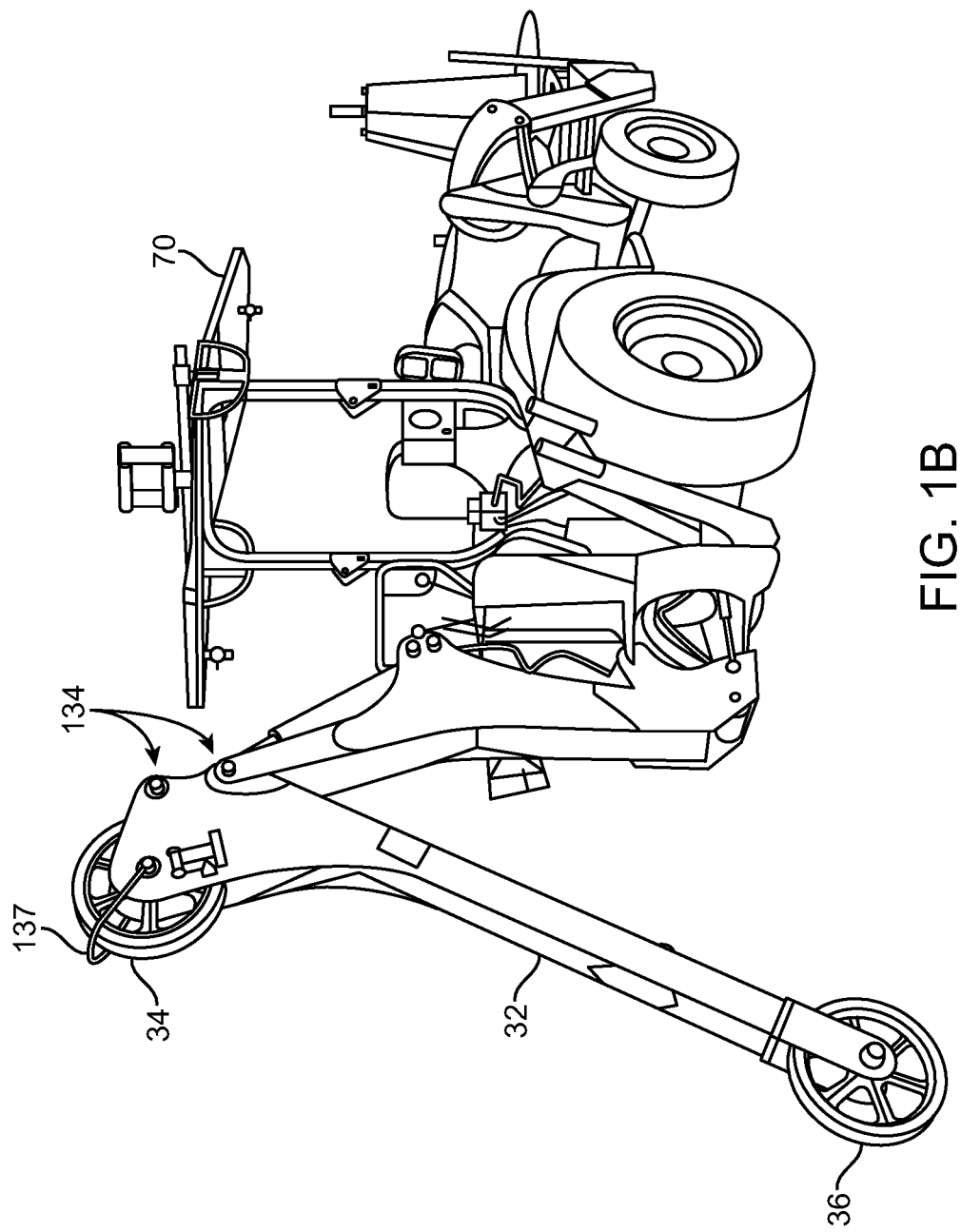
FIG. 1B is a rear perspective view corresponding to FIG. 1A.
Figure 2:
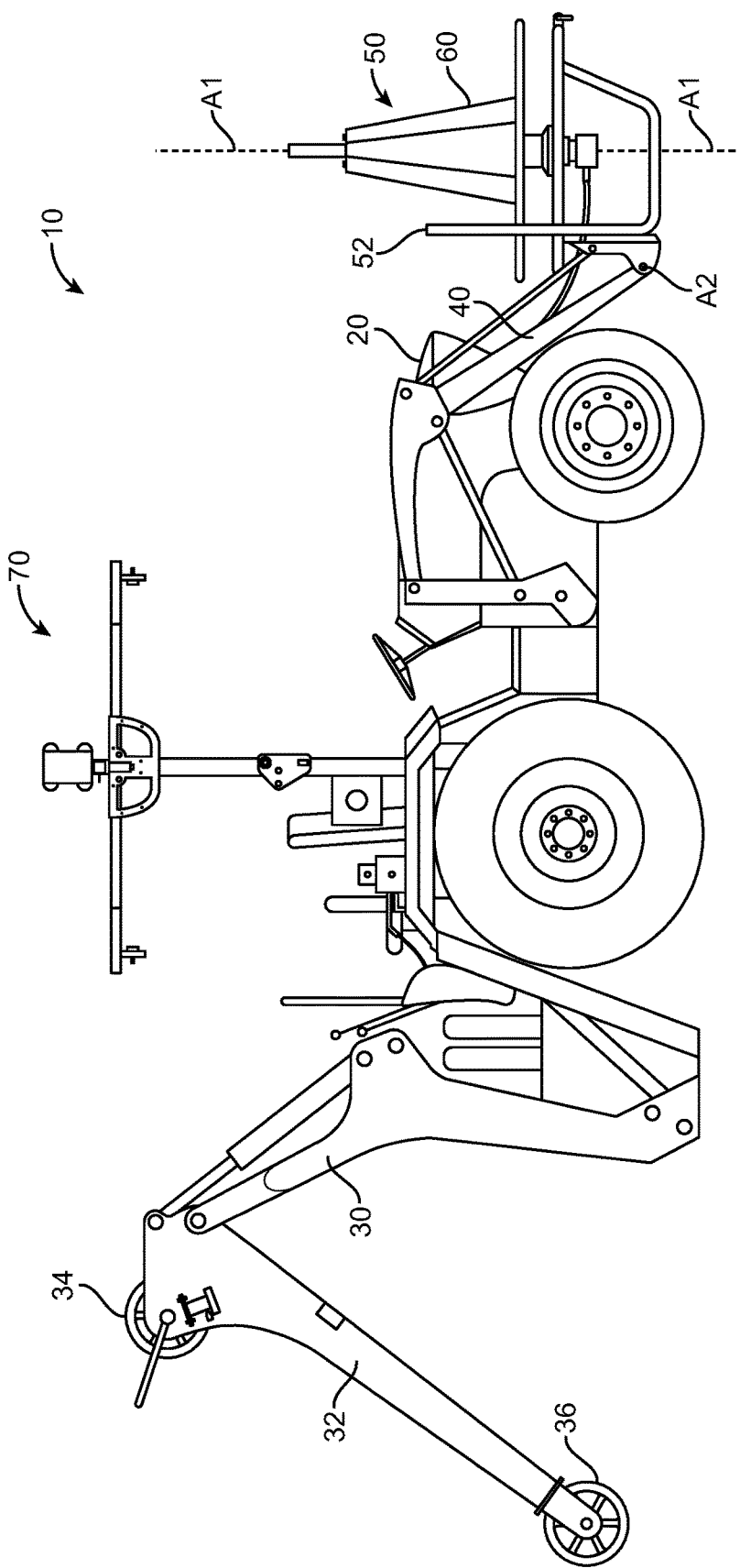
FIG. 2 is a side elevation view of the present modified compact tractor assembly.

The present invention provides a modified compact tractor for pulling cable through underground conduits. FIGS. 1A, 1B and 2 illustrate features of the modified compact tractor system, as follows.

The present system provides an assembly 10 for pulling wire through underground conduits. Assembly 10 preferably comprises: a compact tractor 20; a boom 30 extending from the rear of compact tractor 20; a dipper 32 extending from boom 30. Preferably, dipper 32 has an upper wheel 34 and a lower wheel 36. Compact tractor 20 also includes a pair of loader lifting arms 40 extending from the front of the compact tractor 20, and a detachable rotatable spool assembly 50 mounted to the pair of loader lifting arms 40.

Preferably, the detachable rotatable spool assembly 50 comprises: a detachable mount 52 received onto the pair of loader lifting arms 40, and a rotatable spool 60 attached to detachable mount 52. Rotatable spool 60 rotates around a first axis A1. Preferably, first axis A1 is vertical or approximately vertical to the ground when in the position shown.

Preferably, dipper 32 is easily detachable from boom 30. For example, dipper 32 may be attached to the end of boom 30 by one or more pivot shafts 134 which can easily be removed such that an operator could convert the tractor 20 back into a traditional backhoe by swapping out dipper 32 with a traditional rear bucket (not shown).

Figure 3:
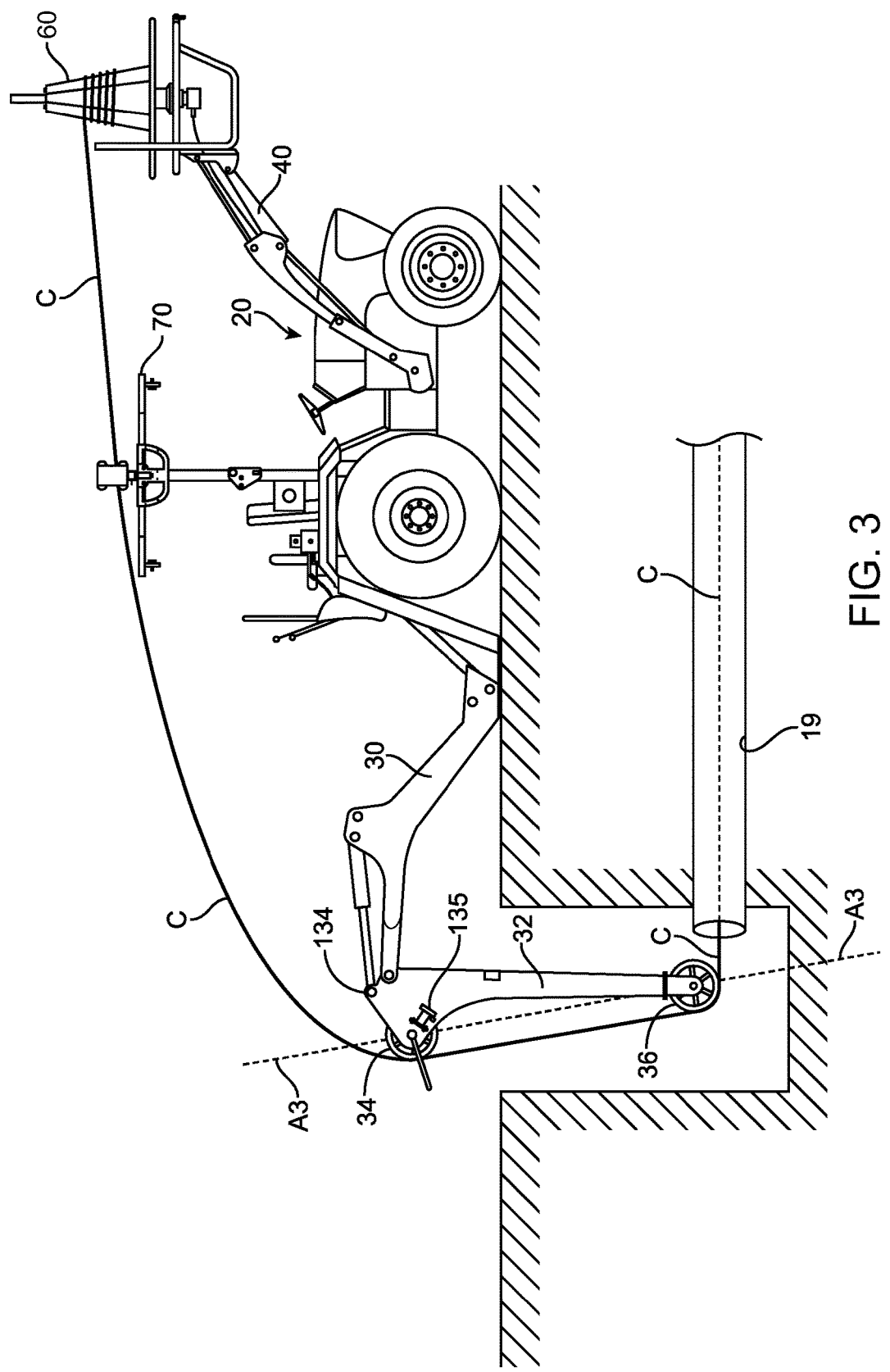
FIG. 3 is a side elevation view of the present system pulling cable from a conduit.

FIG. 3 illustrates the present system in operation pulling cable C out of an underground conduit 19. First, the access panel to an underground electrical vault is removed. Next, the boom 30 and dipper 32 are lowered such that lower wheel 36 is generally aligned with conduit 19. The cable C is then pulled out of conduit 19 such that it passes over wheels 36 and 34, and then over the top of tractor 20 and is taken up on rotatable spool 60. Initially, to start the pulling of the cable out of the conduit, a pull sock connector is placed around the free end of cable C. As tension is exerted on the pull sock connector, it tightens around the end of the cable. The pull sock connector is attached to a rope and the rope is initially threaded over wheels 34 and 36. Initially, several yards of rope are pulled around wheels 34 and 36 when pulling commences. Thus, a short distance of rope is pulled through the present modified tractor prior to cable C being pulled around wheels 34 and 36 and onto the spool 60.

As can be seen, lifting arms 40 are preferably raised such that rotatable spool 60 is lifted to a position such that cable C passes over the top of tractor 20, and above the tractor operator.

In preferred aspects, the lower wheel 36 of dipper 32 is rotatable about a longitudinal axis A3 of the dipper. This rotation allows lower wheel 36 to be correctly aligned with conduit 19 such that cable C is pulled in a straight direction along the axis of the conduit. Optionally, a linear counter 135 is provided adjacent upper wheel 34 such that the operator is able to quickly determine how many linear feet of cable are being pulled out of the conduit. Preferably, a cable guard 137 is also provided to prevent any cable breaks from flying aimlessly around.

Figure 4:
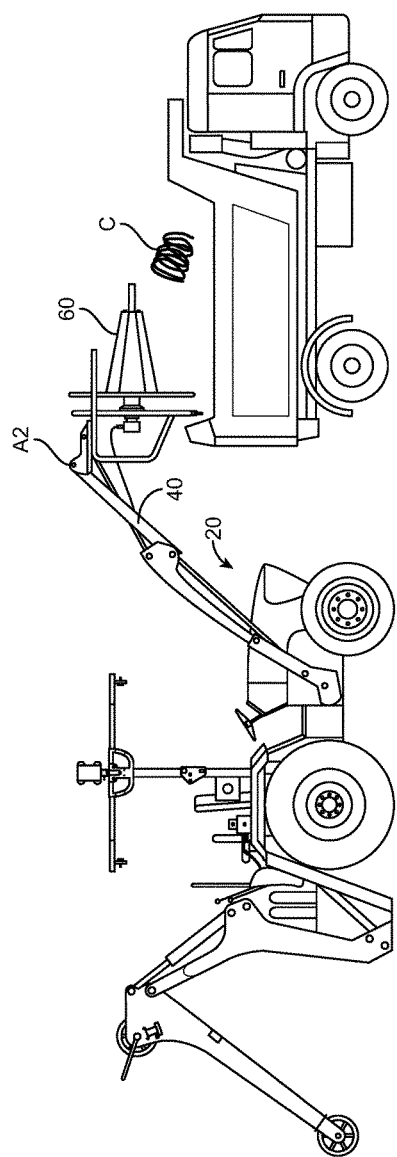
FIG. 4 is a side elevation view of the present system dumping a spool of rolled up cable into the back of a trailer.

As seen in FIG. 4, the movement of the pair of loader lifting arms 40 causes rotatable spool 60 to pivot about a second axis A2 that is perpendicular to first axis A1. Axis A2 is preferably a horizontal axis. Therefore, movement of arms 40 causes the top of rotatable spool 60 to tilt or pivot downwardly such that the roll of cable C falls off rotatable spool 60 and into the back of a truck or trailer.

Figure 5A:
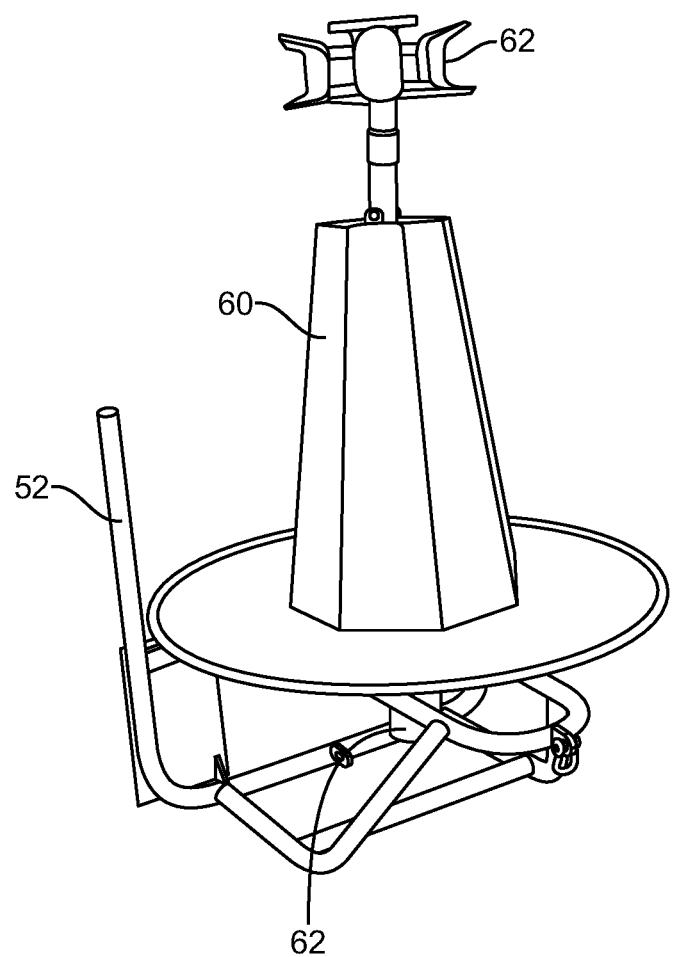
FIG. 5A is a front perspective view of a preferred embodiment of the spool assembly.
Figure 5B:
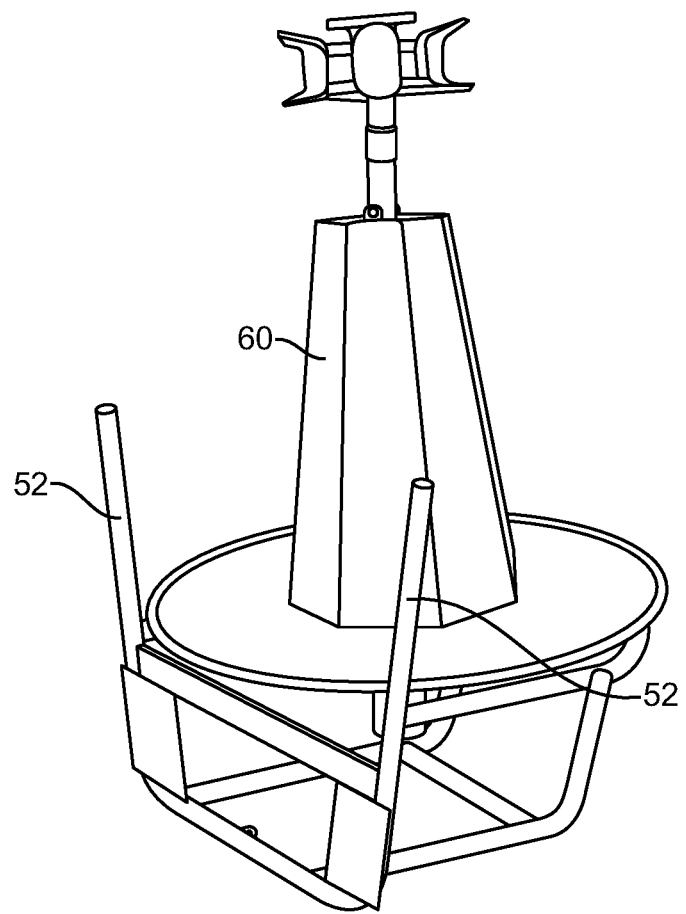
FIG. 5B is a rear perspective view of the spool assembly of FIG. 5A.

FIGS. 5A and 5B show further details of spool assembly 50. Spool assembly 50 includes a detachable mount 52 that is preferably a standard "skid-steer mount" that is dimensioned to be attached onto the pair of loader lifting arms 40. A hydraulic motor 62 rotates spool 60. Hydraulic motor 62 may be connected to a rotatable shaft onto which spool assembly 50 is positioned on compact tractor 20 and powered by hydraulic hoses which preferably are connected with quick release fittings (such that spool assembly 50 can easily be removed).

Preferably, rotatable spool 60 is wide at the bottom and narrow at the top, and may be conical as shown. This has the advantage of easily coiling cable C. Optionally, a butterfly reel 62 may be provided on top of rotatable spool 60. Butterfly reel 62 operates to store the rope that is attached to cable C when the cable pulling initially starts. Specifically, a rope is provided with a pull sock attachment at its end. The pull sock attachment is received over and connected onto the end of cable C. The pulling first starts, the rope is pulled onto butterfly reel 62 and the cable C is then wrapped onto spool 60.

Figure 6A:
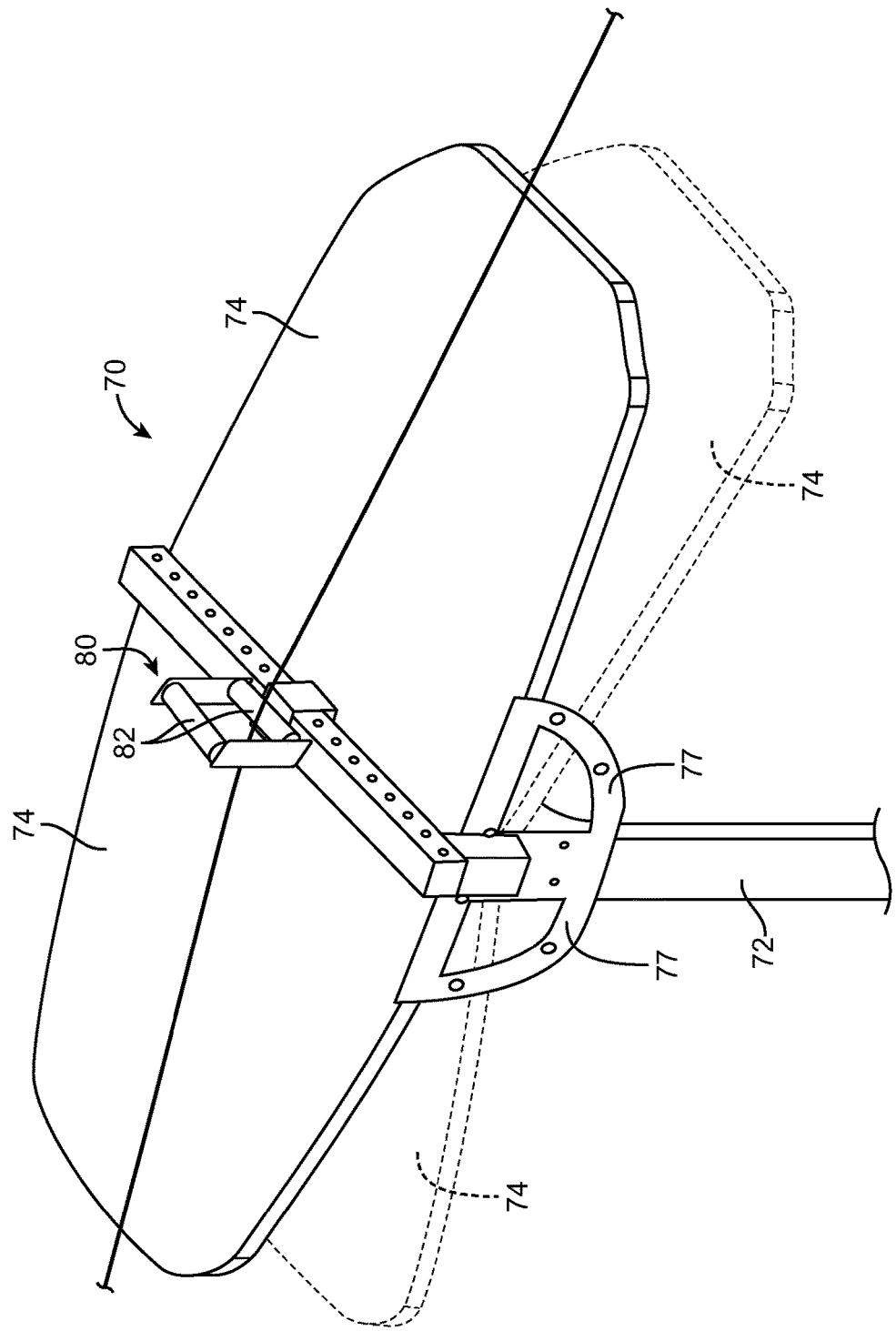
FIG. 6A is a top perspective view of the drip tray (with a second position of the drip tray shown in dotted lines).
Figure 6B:
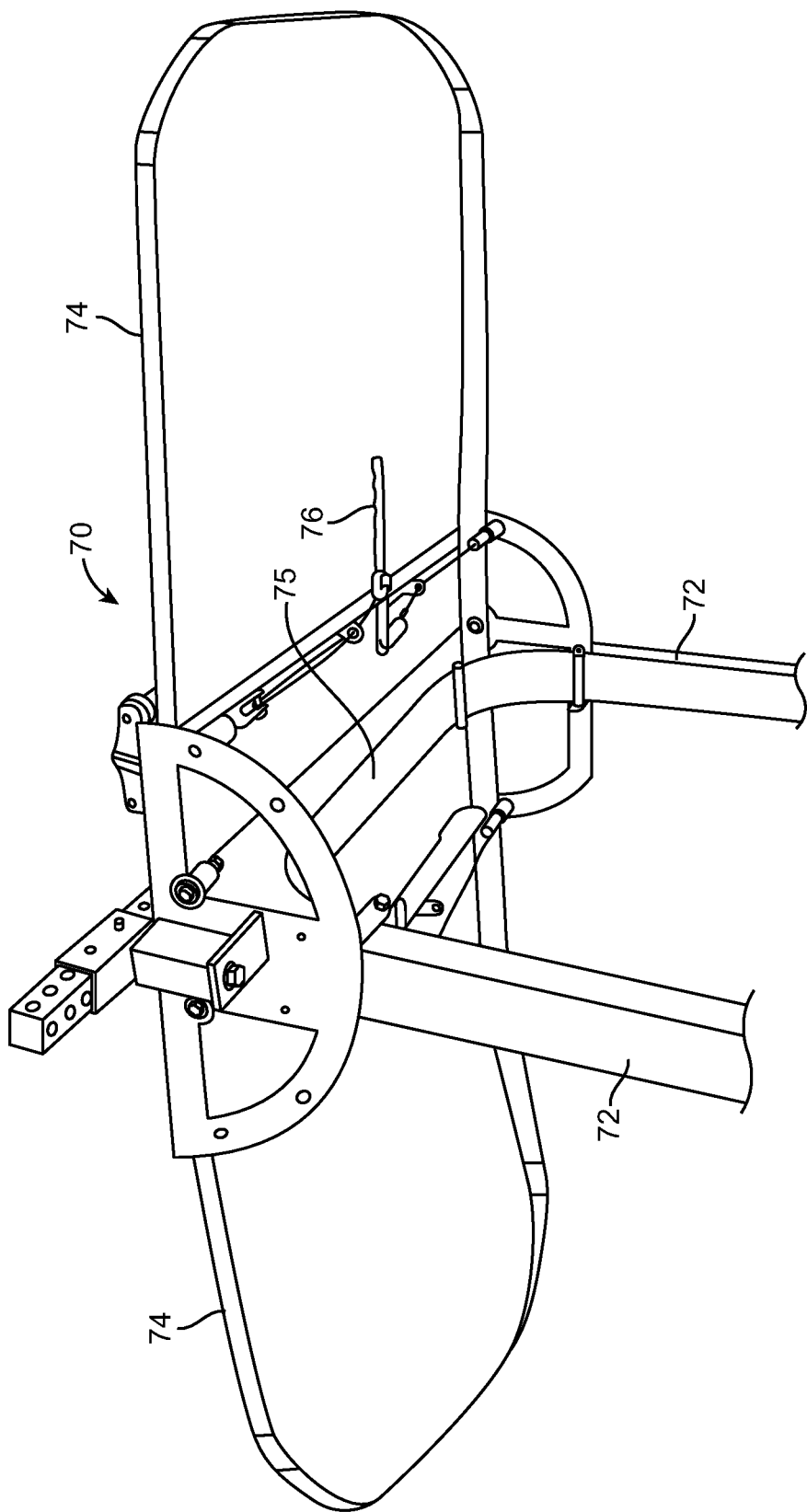
FIG. 6B is a bottom perspective view of the drip tray of FIG. 6A.

FIGS. 6A and 6B illustrate further details of the optional drip tray 70. Drip tray 70 is supported by vertical supports 72 extending upwards from compact tractor 20. Front and back portions 74 are separately positionable such that the angle of either or both can be rotated to different positions (such as those shown in dotted lines). A central assembly 75 can be used for separately positioning the angles of front and back portions 74. Specifically, handles 76 (FIG. 6B) can be used to connect into different positioning settings in brace 77. On top of drip tray 70 is a cable guide assembly 80 having upper and lower rollers 82. The cable C is fed between rollers 82 when the system is in operation. Drip tray 70 prevents dirt and mud from falling on the operator as the cable is pulled over the head of the operator (as seen in FIG. 3).

Figure 7A:
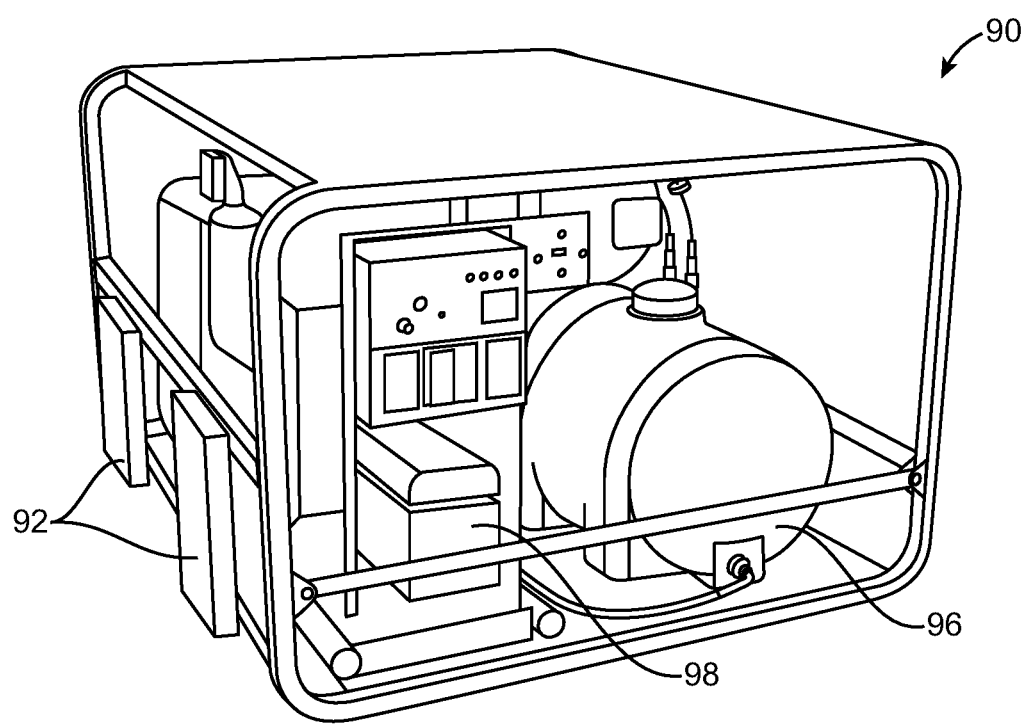
FIG. 7A is a side perspective view of the compression and lubrication assembly.
Figure 7B:
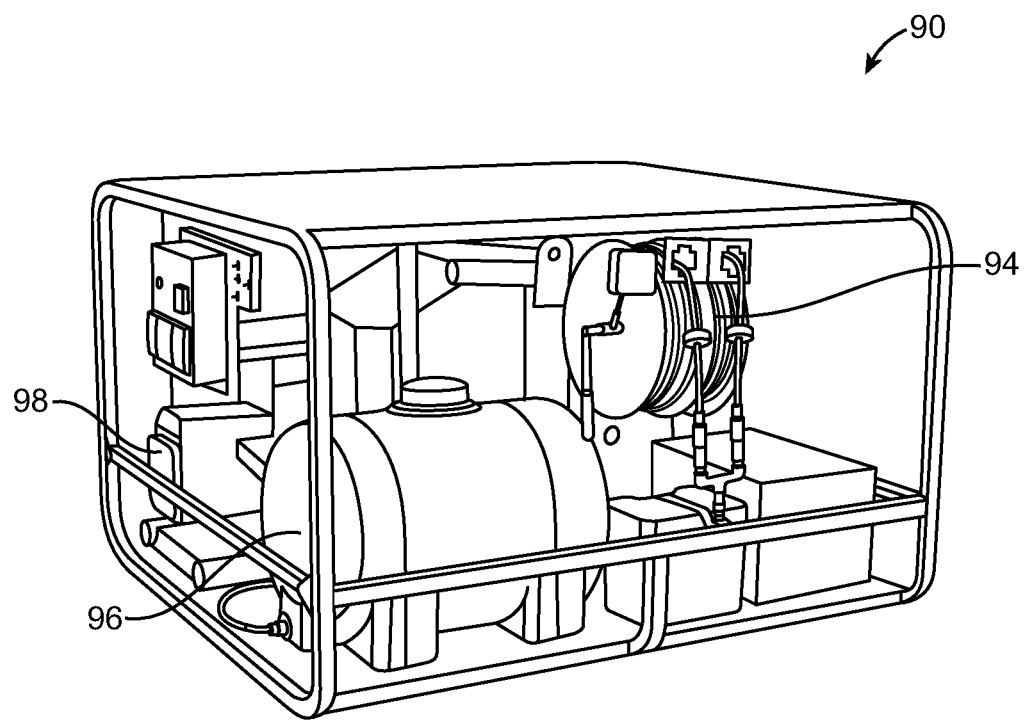
FIG. 7B is a front perspective view of the compression and lubrication assembly of FIG. 7A.
Figure 8:
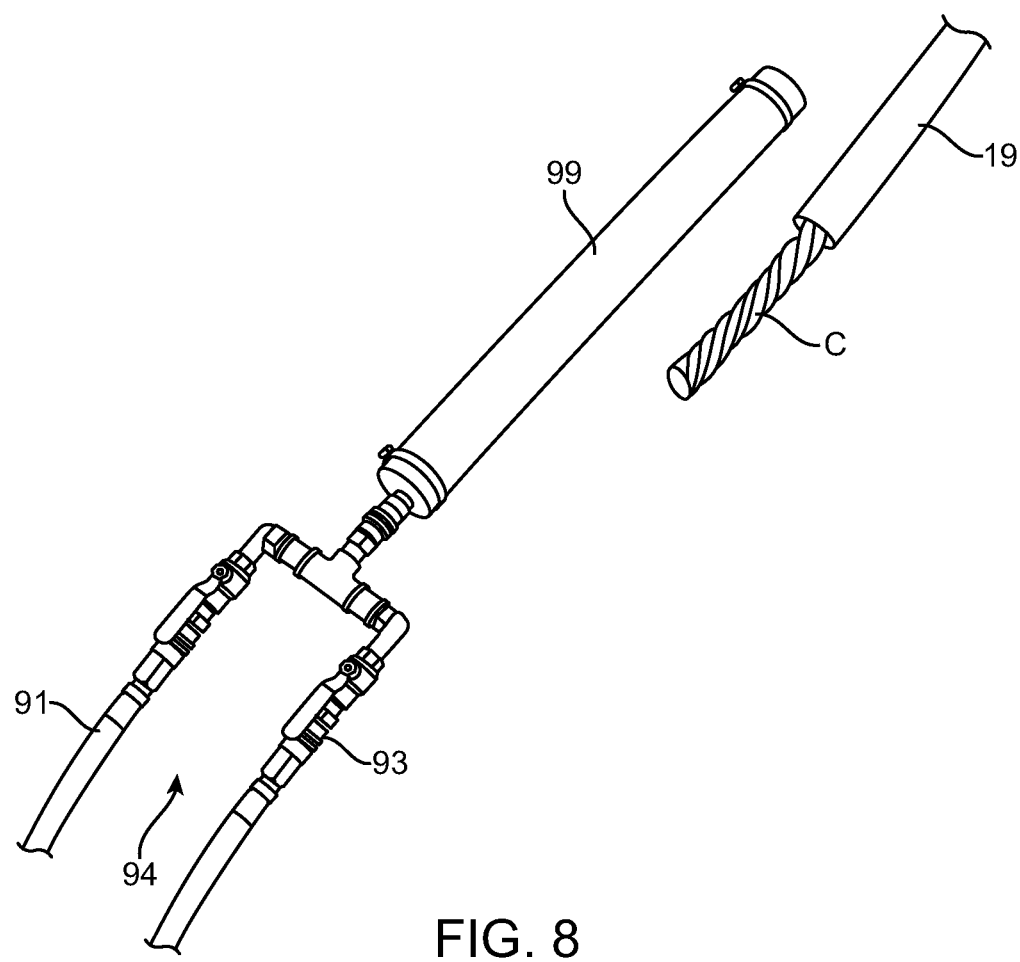
FIG. 8 is a perspective view of the end of the of the lubrication system.

FIGS. 7A, 7B and 8 illustrate a compressor and lubrication assembly 90 dimensioned to be mounted onto the pair of loader lifting arms 40. Preferably, compressor and lubrication assembly 90 comprises: a detachable mount 92 received onto the pair of loader lifting arms 40, a lubrication system 94 for injecting lube into conduit 19 (to loosen the cable C therein and make it easier to pull out); a compressor 96 for pressurizing lubrication system 94, and a generator 98 for powering compressor 96. In operation, compressor 96 squeezes a mixture of air and lube through tube 99 that is received around the outside of the conduit 19. For example, tube 91 may feed air into tube 99 while tube 93 may feed lube into tube 99. The relative flow of each may be independently controlled. As lube and/or air is squeezed through tube 99, it lubricates both the area inside the conduit (i.e.: between the conduit 19 and the cable C) and the outside of the cable (i.e.: between the inside of the conduit and the outside of the cable). Optionally, compressor and lubrication assembly 90 may also contain working lights and power to assist the operator(s).

In operation, the detachable mount 52 of the rotatable spool assembly 50 is interchangeable with the detachable mount 92 of the compressor and lubrication assembly 90 such that the tractor can lift and carry either of the rotatable spool assembly 50 or the compressor and lubrication assembly 90 to the jobsite. This allows the operator to work in small spaces and access the conduit without requiring a large truck(s) to be positioned at the jobsite.

What is claimed is:

1. An assembly for pulling wire through underground conduits, comprising:
   (a) a tractor;
   (b) a boom extending from the rear of the tractor;
   (c) a dipper extending from the boom, the dipper having an upper wheel and a lower wheel thereon;
   (d) a pair of loader lifting arms extending from the front of the tractor; and
   (e) a detachable rotatable spool assembly mounted to the pair of loader lifting arms, wherein the detachable rotatable spool assembly comprises:
      (i) a detachable mount received onto the pair of loader lifting arms, and
      (ii) a rotatable spool attached to the detachable mount, wherein the rotatable spool rotates around a vertical axis,
   wherein movement of the pair of loader lifting arms causes the rotatable spool to pivot about a horizontal axis such that a top of the rotatable spool can be pointed downwardly such that cable on the spool falls off of the spool.

2. The assembly of claim 1, wherein the detachable mount that is received onto the pair of loader lifting arms is a skid-steer mount.

3. The assembly of claim 1, wherein the detachable rotatable spool assembly further comprises a hydraulic motor for rotating the rotatable spool.

4. The assembly of claim 1, wherein the dipper is detachable from the boom.

5. The assembly of claim 1, wherein the lower wheel of the dipper is rotatable about a longitudinal axis of the dipper.

6. The assembly of claim 1, wherein the rotatable spool is wide at the bottom and narrow at the top.

7. The assembly of claim 6, wherein the rotatable spool is conical.

8. The assembly of claim 1, further comprising a butterfly reel on top of the rotatable spool.

9. The assembly of claim 1, further comprising a drip tray mounted on top of the tractor.

10. An assembly for pulling wire through underground conduits, comprising:
    (a) a tractor;
    (b) a boom extending from the rear of the tractor;
    (c) a dipper extending from the boom, the dipper having an upper wheel and a lower wheel thereon;
    (d) a pair of loader lifting arms extending from the front of the tractor;
    (e) a detachable rotatable spool assembly mounted to the pair of loader lifting arms, wherein the detachable rotatable spool assembly comprises:
       (i) a detachable mount received onto the pair of loader lifting arms, and
       (ii) a rotatable spool attached to the detachable mount, wherein the rotatable spool rotates around a first axis,
    wherein movement of the pair of loader lifting arms causes the rotatable spool to pivot about a second axis that is perpendicular to the first axis; and
    (d) a drip tray mounted on top of the tractor, wherein the angle of the drip tray to the ground is variable.

11. An assembly for pulling wire through underground conduits, comprising:
    (a) a tractor;
    (b) a boom extending from the rear of the tractor;
    (c) a dipper extending from the boom, the dipper having an upper wheel and a lower wheel thereon;
    (d) a pair of loader lifting arms extending from the front of the tractor;
    (e) a detachable rotatable spool assembly mounted to the pair of loader lifting arms, wherein the detachable rotatable spool assembly comprises:
       (i) a detachable mount received onto the pair of loader lifting arms, and
       (ii) a rotatable spool attached to the detachable mount, wherein the rotatable spool rotates around a first axis,
    wherein movement of the pair of loader lifting arms causes the rotatable spool to pivot about a second axis that is perpendicular to the first axis; and
    (f) a linear counter on the upper wheel of the dipper.

12. An assembly for pulling wire through underground conduits, comprising:
    (a) a tractor;
    (b) a boom extending from the rear of the tractor;
    (c) a dipper extending from the boom, the dipper having an upper wheel and a lower wheel thereon;
    (d) a pair of loader lifting arms extending from the front of the tractor;
    (e) a detachable rotatable spool assembly mounted to the pair of loader lifting arms, wherein the detachable rotatable spool assembly comprises:
       (i) a detachable mount received onto the pair of loader lifting arms, and
       (ii) a rotatable spool attached to the detachable mount, wherein the rotatable spool rotates around a first axis,
    wherein movement of the pair of loader lifting arms causes the rotatable spool to pivot about a second axis that is perpendicular to the first axis; and
    (f) a compressor and lubrication assembly dimensioned to be mounted onto the pair of loader lifting arms, wherein the compressor and lubrication assembly comprises:
       (i) a detachable mount received onto the pair of loader lifting arms,
       (ii) a lubrication system for injecting lube into a conduit;

(iii) a compressor for pressurizing the lubrication system, and (iv) a generator for powering the compressor.

13. The assembly of claim 12, wherein the detachable mount of the rotatable spool assembly is interchangeable with the detachable mount of the compressor and lubrication assembly such that the tractor can lift and carry either of the rotatable spool assembly or the compressor and lubrication assembly.

\* \* \* \* \*